United States Patent [19]

Lindenberg et al.

[11] 4,065,116
[45] Dec. 27, 1977

[54] CLAMPING OF BATTERY PLATE BLOCK ASSEMBLIES

[75] Inventors: Hans-Georg Lindenberg, Hannover; Joachim Illmann, Stelingen; Hans-Joachim Golz, Hannover, all of Germany

[73] Assignee: Varta Batterie Aktiengesellschaft, Hannover, Germany

[21] Appl. No.: 725,638

[22] Filed: Sept. 22, 1976

[30] Foreign Application Priority Data

Dec. 2, 1975 Germany .............................. 2554069

[51] Int. Cl.² .............................................. A61G 13/00

[52] U.S. Cl. ................................ 269/22; 29/730; 100/269 A

[58] Field of Search ................... 269/22; 254/93 MP; 144/281 A; 100/269 A; 29/204 R

[56] References Cited

U.S. PATENT DOCUMENTS

| 2,054,864 | 9/1936 | Owen | 269/22 |
| 2,383,227 | 8/1945 | Thaden | 144/281 A |
| 3,661,683 | 5/1972 | Engel et al. | 269/22 |

Primary Examiner—Robert C. Watson
Attorney, Agent, or Firm—Weiser, Stapler & Spivak

[57] ABSTRACT

Plate blocks are clamped by pneumatically inflatable multilayer elements.

11 Claims, 4 Drawing Figures

CLAMPING OF BATTERY PLATE BLOCK ASSEMBLIES

The invention relates to apparatus for holding together blocks of plates consisting of positive electrodes, negative electrodes and separators.

In the manufacture of batteries, blocks of plates are assembled which then must be further processed. For example, pole bridges must be cast or welded on to the plate lugs of the electrodes. Particularly in the manufacture of starter batteries it is customary to assemble several such plate blocks into a plate assembly, these numbering six in the conventional starter battery, and then to further process them. The space between individual plate blocks corresponds to the thickness of the cell separating partitions of the battery box into which the block assembly is subsequently inserted.

Both the individual plate blocks and the block assembly formed of these individual plate blocks must be firmly mounted and clamped during the subsequent processing in order that manufacturing defects and high reject rates be averted, and in order that the final assembly of the battery proceed smoothly. Since the separators protrude beyond the electrodes in all directions, it is particularly not practical to clamp the plate block at its head end. For clamping, particularly when a block assembly is involved, there remain available only the small spaces between adjacent faces of the plate blocks corresponding to the thickness of the battery box subdividing partitions. For battery boxes which are made of polypropylene, for example, these battery box subdividing partitions have a thickness of about 1.5 to 3 mm.

Apparatus for clamping such block assemblies is taught, for example, in U.S. Pat. No. 3,744,112. There the plate blocks are inserted in a cassette whose configuration corresponds generally to that of the battery box. Slots are provided in the dividing partitions of this cassette into which protrude or project clamping fingers, each consisting of two spring steel tongues separated by a rubber spring. These clamping fingers or claws are then slid forward until there is achieved firm attachment between the loose plates and separators, or of the plate block within the cassette which is open at both ends.

A disadvantage of such arrangements is that they do not take into account thickness tolerance variations which are always present in the plate blocks and which are attributable to the summation of the individual tolerances of the positive, and negative plates as well as the separators. In the known arrangements this results in firm clamping of the thickest plate block while the remaining plate blocks of the block assembly may, depending on their tolerance deviations, not be firmly clamped or even be loose. Furthermore, in the known clamping arrangements, the outer-most plates of each plate block are frequently damaged, being particularly subject to frame cracking and mass crumbling.

Accordingly, it is an object of the present invention to provide a clamping device which firmly clamps a plate block, or alternatively the plate blocks of a block assembly, uniformly and independently of their tolerance variations.

It is another object to provide such an element which does not subject the end plates of the blocks to damage.

These and other objects of the invention which will appear are achieved, in accordance with the invention, by utilizing as the clamping element a planar, pneumatic clamping element positioned adjacent the outer faces of the plate blocks.

For further details reference is made to the discussion which follows in light of the accompanying drawings wherein.

The same reference numerals are used in the various figures to denote similar elements.

Figure 2:
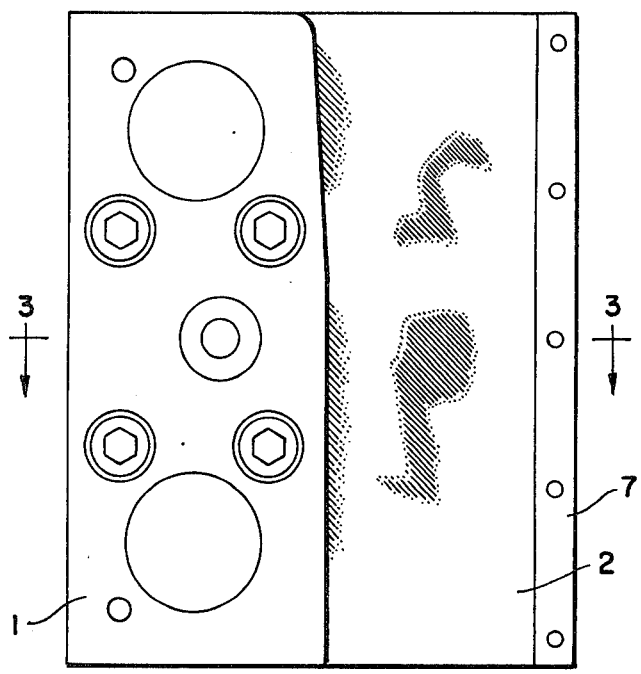
FIG. 2 is a section taken along II—II in FIG. 1 showing a single clamping element view in elevation.
Figure 3:
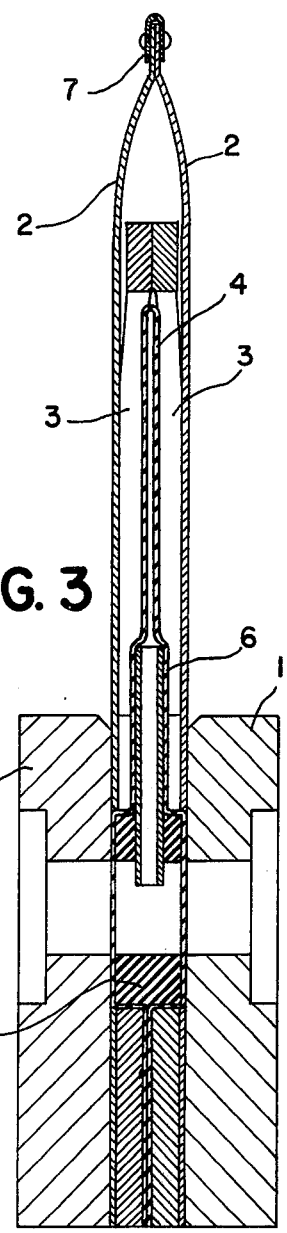
FIG. 3 shows a cross-section of a clamping element taken along III—III in FIG. 2.
Figure 4:
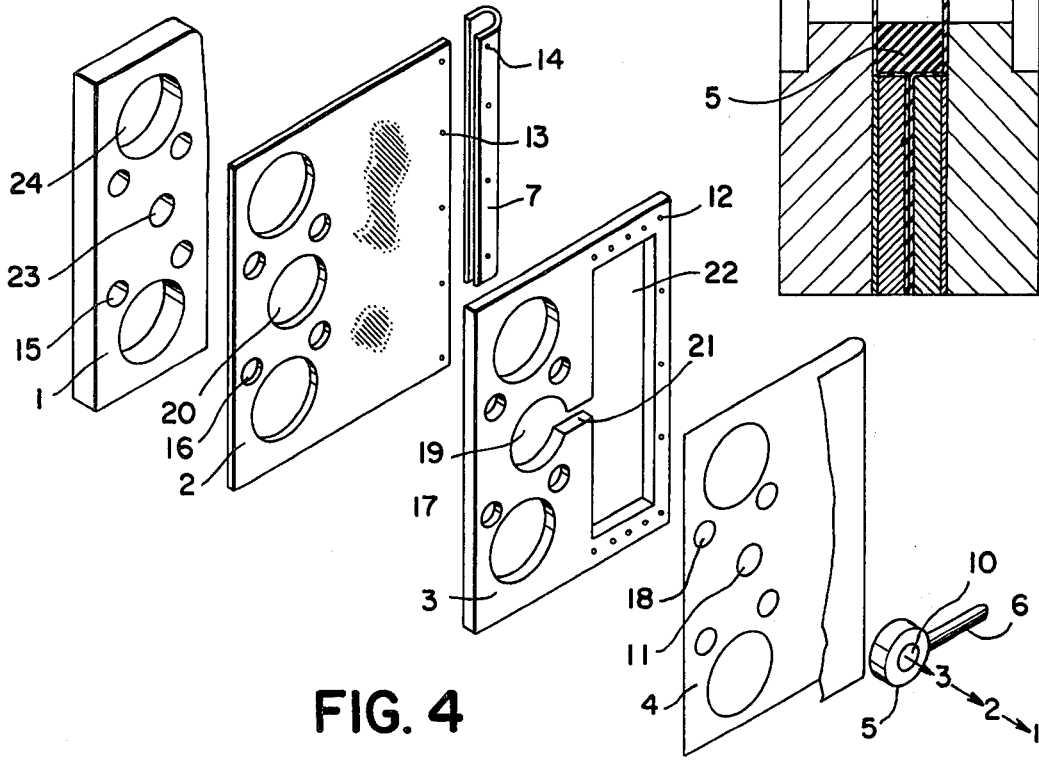
FIG. 4 is an exploded view of certain components of a clamping element.

Referring to these drawings, each clamping element 30a includes, as particularly shown in FIGS. 2 through 4, a base plate 1, a pressure plate 2, a bulkhead plate 3, membrane layer 4, sealing ring 5, inlet tube 6 and clamping last 7.

Tube 6, which may for example be of copper, is inserted radially into sealing ring 5, which may be of rubber. Membrane material or foil 4 is juxtaposed to the lateral surfaces of sealing ring 5 in such manner that the aperture 10 within the sealing ring is aligned with aperture 11 in the membrane material. Membrane 4 may be of natural or synthetic fiber fabric coated with rubber. On each side of this subassembly a bulkhead 3 is placed. The two bulkheads 3 are then riveted together with the intermediate membrane material 4 through apertures 12. Finally, a metal clamping plate 2 is applied on each side. The exposed edges of clamping plates 2 are enclosed by clamping last 7 and riveted together through apertures 13 and 14. To the side of each clamping plate 2 there is then applied a base plate 1. The resultant multilayer construction is illustrated in cross-section in FIG. 3.

Through aligned apertures 15, 16, 17 and 18, components 1, 2, 3 and 4 can be bolted together. In the course of such bolting, membrane material 4 and sealing ring 5 are deformed and fill the apertures 19 and 20 within clamping plates 2 and bulkhead 3. Pipe 6 is thereby embedded in membrane material 4 within the cut-out 21 of bulkhead 3. In the bolted-together element there is thus formed an externally air tight membrane element having the size of cut-outs 22 in bulkheads 3. This membrane element has, in the region of the cut-out in bulkhead 3, direct contact with the resilient metal clamping plates 2. These clamping plates 2 follow deformations of the membrane and simultaneously serve to protect the membrane from damage by foreign objects. The apertures 24 in the clamping element are used to mount the unit in a clamping cassette which is capable of receiving multiple plate block assemblies.

To achieve clamping, the clamping element is supplied with air under pressure via aperture 23 in base plate 1. The air under pressure is supplied to the membrane element via apertures 23, 11 and 10 as well as tube 6. Under the influence of this air under pressure, the membrane inflates within cut-out 22 of bulkhead 3 and causes the immediately adjoining clamping plate 2 to bulge outward. This change in shape is indicated by the configuration of dot dash lines 30 in FIG. 1. To unclamp the element, the air pressure inlet is vented and the clamping plates 2 then exert their own resilient force upon membrane 4 causing the air to escape. The thickness of the clamping element 30 in its clamping state may be approximately three times its thickness in its non-clamping state. The clamping force itself depends upon the supplied air pressure and is therefore adjustable within wide limits.

Figure 1:
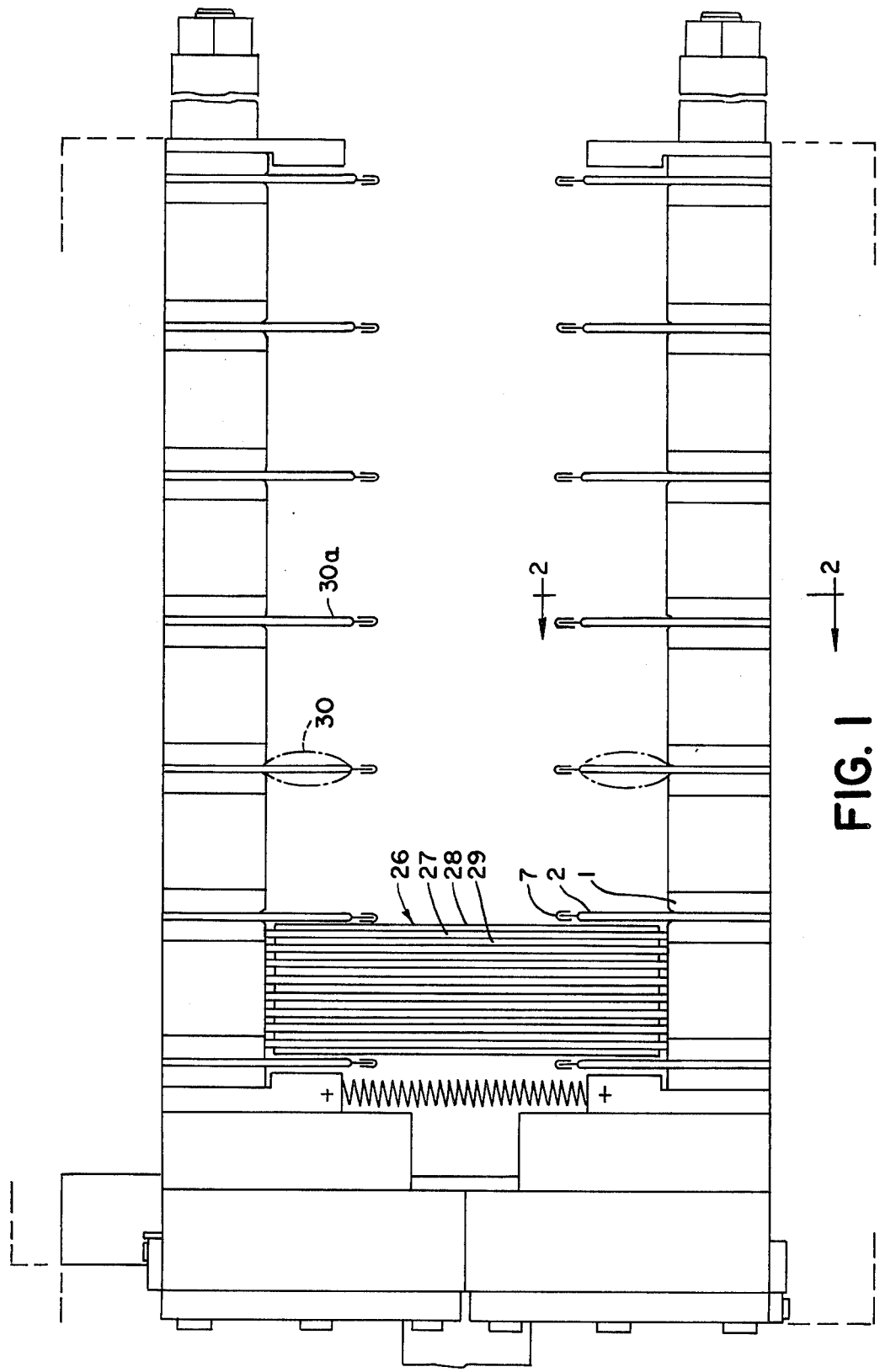
FIG. 1 is a diagrammatic representation of a cassette for holding six plate blocks, one such block being shown in position within the cassette.

As is apparent from FIG. 1, a plurality of clamping elements embodying the invention may be positioned within a cassette which is capable of receiving a plurality of plate blocks. Pairs of clamping elements are oppositely placed and the distance between clamping elements corresponds to the dimensions of the plate blocks to be received. In FIG. 1, one such plate block 26 is diagrammatically illustrated. It is composed of separators 27, negative electrode plates 28 and positive electrode plates 29. The plate blocks with their varying tolerances are inserted into the individual cells of the cassette, after which air under pressure is supplied, via a suitable valve and a conduit built into the cassette, to the individual clamping elements. As a result these clamping elements become inflated as shown at 30 in FIG. 1 and the clamping plates 2 of the clamping elements press with their surfaces against these plate blocks in accordance with the air pressure applied by the membrane, thereby clamping the plate block securely. In this way all of the plate blocks are securely clamped, despite their varying tolerances, with substantially equal force by means of the pneumatic clamping elements.

In this manner, there is achieved a smooth and reliable manufacturing and assembly technique, and damage to the individual elements of any given plate block is precluded. The clamping elements embodying the invention are particularly desirable because, although they are extremely thin, nevertheless they are capable of providing very high clamping forces. This makes them particularly desirable for use in the very small interstices between the elements to be clamped.

We claim:

1. Apparatus for clamping together the plate blocks of lead storage batteries, comprising:
   at least one clamping element positioned adjacent an outer surface of the block,
   the element having generally planar face engaging the block surface,
   the element being constructed so that the planar face is pneumatically deformable so as to bulge toward the adjacent block surface, thereby to apply a controllable clamping force to said surface,
   the element having a multi-layer construction, including innermost layers formed of an elastic membrane, and resilient plates adjacent portions of the outer surfaces of the membrane, and means for introducing gas under pressure between the innermost layers,
   the elastic membrane being responsive to the gas pressure to expand, thereby pressing outwardly against the resilient plates and causing them to bulge and provide the clamping force, and
   the element having bulkheads positioned between the membrane and the plates, the bulkheads having cut-outs through which the membrane can bear against the plates.

2. The apparatus of claim 1 wherein the means for introducing the gas includes a deformable sealing ring and a tube extending radially outward from the ring, the ring being embedded in apertures in the bulkheads and squeezed between apertures in the membranes, all these apertures being aligned, and the tube extending into the interior region of the membrane adjacent the bulkhead cut-outs.

3. The apparatus of claim 1 wherein adjacent outer edges of the resilient plates are united by a clamping last.

4. The apparatus of claim 1 wherein the element further comprises base plates adjacent the outer faces of the resilient plates, in portions of these plates which are not adjacent the cut-outs in the bulkheads.

5. The apparatus of claim 1 comprising a plurality of the clamping elements respectively positioned adjacent different corners of the plate block assembly.

6. The apparatus of claim 5 wherein the clamping elements are positioned within a cassette for holding a plurality of plate blocks, pairs of the elements being positioned opposite each other on opposite sides of the cassette, and adjacent elements being spaced apart along one side of the cassette by a distance substantially equal to the width of a plate block.

7. The apparatus of claim 6 wherein means are provided for supplying air under pressure to all the elements simultaneously.

8. The apparatus of claim 7 wherein the air is supplied to all the elements at substantially the same pressure, whereby these elements expand to varying degrees to clamp the plate blocks despite tolerance variations in the dimensions of the blocks.

9. A pneumatic clamping element having generally planar face deformable so as to bulge and having a multilayer construction, the element including:
   innermost layers formed of an elastic membrane,
   resilient plates adjacent portions of the outer surfaces of the membrane,
   means for introducing gas under pressure between the innermost layers, the membrane being responsive to the gas pressure to expand, thereby pressing outwardly against the adjacent resilient plate portions and causing the plates to bulge, and
   bulkheads positioned between the membrane and the plates, the bulkheads having cut-outs through which the membrane can bear against the plates.

10. A pneumatic clamping element having generally planar face deformable so as to bulge and having a multi-layer construction, the element including:
    innermost layers formed of an elastic membrane,
    resilient plates adjacent portions of the outer surfaces of the membrane,
    means for introducing gas under pressure between the innermost layers, the membrane being responsive to the gas pressure to expand, thereby pressing outwardly against the adjacent resilient plate portions and causing the plates to bulge, and
    bulkheads positioned between the membrane and the plates, the bulkheads having apertures through which the membrane can bear against the plates.

11. A pneumatic clamping element having generally planar face deformable so as to bulge and having a multi-layer construction, the element including:
    innermost layers formed of an elastic membrane,
    resilient plates adjacent portions of the outer surfaces of the membrane,
    means for introducing gas under pressure between the innermost layers, the membrane being responsive to the gas pressure to expand, thereby pressing outwardly against the adjacent resilient plate portions and causing the plates to bulge, and bulkheads positioned between the membrane and the plates, each bulkhead having portions defining a frame surrounding an opening through which the membrane can bear against the plates.

* * * * *